Patented Dec. 23, 1952

2,622,989

UNITED STATES PATENT OFFICE 2,622,989

CEMENTITIOUS STRUCTURAL COMPOSITION

Aram Keyishian, Huntington Station, N. Y.

No Drawing. Application January 6, 1951,
Serial No. 204,825

6 Claims. (Cl. 106—89)

The present invention relates to structural forms in which Portland cement is employed with aggregate, usually sand, cinders, crushed gravel, flyash, or the like, in the building of blocks, panels, and other structural units and the construction of road surfaces. The specific object of the invention is to enable the production of such structures with a great saving in the quantity of cement used and, at the same time, to retain the normal strength, including crushing strength of said structures incorporating the presently used proportions of cement. As an example of the standard practice at the present time, about seven parts of aggregate are considered as the maximum proportion of aggregate with one part of Portland cement in order that the article made therefrom may have a crushing strength of 900 lbs. per square inch. Thus in the making of concrete blocks to withstand a crushing force of 900 lbs. per square inch, the mix is about 662 lbs. of grit (crushed cinders are included in this term) and sand, with 94 lbs. of Portland cement.

By means of the present invention, the said ratio of 7 lbs. of aggregate to one pound of cement may be reduced, as to the cement, to one part thereof and 12 parts of aggregate, with maintenance of the said crushing strength resistance, which resistance may in fact be higher. Thus, as an example:

| | Pounds |
|---|---|
| Cement | 61 |
| Grit and sand | 700 |

The above two constituents are thoroughly mixed with water, the latter being in the usual proportion as is customary with cement block pouring in order that the particles will adhere under light pressure but will not be in the free flowing fluid characteristic. To the said mix is added and thoroughly co-mingled:

| | Ounces |
|---|---|
| Sodium hydroxide | 13 |
| Magnesium sulfate | 21 |

The mixture is tamped in the usual molds for structural blocks and then air or steam dried for the usual period of days preparatory to shipment and use.

Blocks thus made have a crushing resistance substantially in excess of 900 lbs. per square inch. As a further example:

| | |
|---|---|
| Crushed cinders | 1,250 lbs. |
| Flyash | 1,250 lbs. |
| Portland cement | 100 lbs. |
| Sodium hydroxide | 4 lbs. 8 ozs. |
| Magnesium sulfate | 7 lbs. 2 ozs. |

Structural blocks made in the manner above described, this being three cell blocks, measure 12" x 8" x 18". These blocks have a crushing strength resistance of 1,145 to 1,183 lbs. per square inch.

Potassium hydroxide may be substituted for the sodium hydroxide, and potassium sulfate or sodium sulfate may be substituted for the magnesium sulfate.

While 0.20% of the combined chemicals in relation to the dry constituents of the mix will ordinarily be fully operative, I prefer that at least 0.33% of the chemical constituents be employed. This proportion may be substantially increased but increases above 0.80% by weight of the combined aggregate and cement is generally unnecessary, and 1% may be considered as the maximum required under normal conditions. Beyond this proportion an increase appears to salt out but not to damage the product. The ratio of sulfate to the hydroxide may be increased if desired and generally should be above that of the hydroxide. For example 2 parts sulfate to 1 part hydroxide is a fully operating ratio, and at the same time decreasing the sulfate to about equal the hydroxide is operative.

I have found that the said chemical constituents will enable the formation of hard and very strong blocks and other units from Portland cement above. For example, white Portland cement to which is added potassium hydroxide 1 part and sodium sulfate 2 parts, the chemical mixture being by weight about 0.33% of the cement and the total materials being thoroughly mixed by water to a thick paste consistency, will, when dried, provide a plate, block or other unit having the characteristics of white marble as to appearance and strength.

Having described my invention, what I claim and desire to secure by Letters Patent is as follows:

1. A cementitious structural composition consisting essentially of Portland cement, an aggregate material, a member of the group consisting of sodium and potassium hydroxide, and a member of the group consisting of magnesium sulfate, potassium sulfate and sodium sulfate, the said chemical agents being by weight less than the weight of the cement and not less than 0.33% of the cement.

2. A cementitious structural composition consisting essentially of Portland cement, an aggregate material, a member of the group consisting of sodium and potassium hydroxide, and a member of the group consisting of magnesium sulfate, potassium sulfate and sodium sulfate, the said chemical agents being by weight between 0.33% and about 1% of the cement.

3. A cementitious structural composition consisting essentially of Portland cement, an aggregate material, a member of the group consisting of sodium and potassium hydroxide, and a member of the group consisting of magnesium sulfate, potassium sulfate and sodium sulfate, the said chemical agents being by weight less than the weight of the cement and not less than 0.33% of the cement, the sulfate being in excess of the hydroxide.

4. A cementitious structural composition consisting essentially of Portland cement, an aggregate material, a member of the group consisting of sodium and potassium hydroxide, and a member of the group consisting of magnesium sulfate, potassium sulfate and sodium sulfate, the said chemical agents being by weight less than the weight of the cement and not less than 0.33% of the cement, the sulfate being in quantity by weight at least 125% of the hydroxide.

5. A cementitious structural composition consisting essentially of Portland cement, an aggregate material, a member of the group consisting of sodium and potassium hydroxide, and a member of the group consisting of magnesium sulfate, potassium sulfate and sodium sulfate, the said chemical agents being by weight less than the weight of the cement and not less than 0.33% of the cement and aggregate, the sulfate being by weight about twice that of the hydroxide.

6. A cementitious mixture adapted for concrete block construction consisting essentially of Portland cement, water, and the aqueous reaction product of a compound selected from the group consisting of sodium and potassium hydroxide and a member of the class consisting of magnesium sulfate, potassium sulfate, and sodium sulfate, the latter being in greater weight proportion than the hydroxide, the said hydroxide and sulfate constituents being by dry weight not less than 0.33% of the weight of the cement.

ARAM KEYISHIAN.

REFERENCES CITED

The following references are of record in the file of this patent:

UNITED STATES PATENTS

| Number | Name | Date |
| --- | --- | --- |
| 1,534,240 | Newberry | Apr. 21, 1925 |
| 1,901,890 | Barnhart | Mar. 21, 1933 |
| 1,997,782 | Windecker | Apr. 16, 1935 |

FOREIGN PATENTS

| Number | Country | Date |
| --- | --- | --- |
| 530,305 | Great Britain | 1910 |